US00H002116H

(19) United States
(12) Statutory Invention Registration
Parra et al.
(10) Reg. No.: US H2116 H
(43) Published: Apr. 5, 2005

(54) METHOD FOR DETECTING, LOCATING, AND CHARACTERIZING SINGLE AND MULTIPLE FLUID-FILLED FRACTURES IN FRACTURED FORMATIONS

(75) Inventors: Jorge Octavio Parra, Helotes, TX (US); Pei-Cheng Xu, Mississauga (CA)

(73) Assignee: Southwest Research Institute, San Antonio, TX (US)

(21) Appl. No.: 10/331,262

(22) Filed: Dec. 30, 2002

(65) Prior Publication Data

US 2003/0174581 A1 Sep. 18, 2003

Related U.S. Application Data

(60) Provisional application No. 60/345,577, filed on Dec. 31, 2001.

(51) Int. Cl.[7] ..... G01V 1/30

(52) U.S. Cl. ..... 367/56; 73/152.58

(58) Field of Search ..... 73/592, 602, 152.12, 73/152.16, 152.46; 367/30, 35, 37, 32, 56, 28, 75, 25

(56) References Cited

U.S. PATENT DOCUMENTS 4,587,641 A * 5/1986 DiFoggio ..... 367/30

5,402,392 A * 3/1995 Lu et al. ..... 367/75

* cited by examiner

*Primary Examiner*—Daniel Pihulic
(74) *Attorney, Agent, or Firm*—Baker Botts L.L.P.

(57) ABSTRACT

A method to analyze full waveform multiple (i.e., monopoles, dipoles, quadrupoles) acoustic measurements in a fluid-filled borehole, surrounded by a system of fractures oriented parallel to the axis of the borehole. The method uses new measurement attributes, herein referred to as dual flexure waves and leaky fracture mode.

8 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR DETECTING, LOCATING, AND CHARACTERIZING SINGLE AND MULTIPLE FLUID-FILLED FRACTURES IN FRACTURED FORMATIONS

RELATED PATENT APPLICATION

This application claims the benefit of U.S. Provisional Application No. 60/345,577 filed Dec. 31, 2001 and entitled "Method for Detecting, Locating and Characterizing Fluid-Filled Fractures".

TECHNICAL FIELD OF THE INVENTION

This invention relates to methods of oil and gas exploration, and more particularly to detection, location, and characterization of fluid-filled fractures using acoustic measurements.

BACKGROUND OF THE INVENTION

To better understand the influence of fractures on oil and gas production, a core analysis and a detailed logging program are usually required. The general objectives of such a program are first to identify fractures, second to orient the fractures, and third to predict their influence on the production of individual wells. To accomplish this detection and characterization of fractures in reservoirs, two logging measurement techniques are used to image the subsurface surrounding the borehole. These are the formation micro scanner (FMS) and the borehole televiewer (BHTV). Existing commercial BHTV and FMS techniques do not give a quantitative measure of fracture aperture. Fracture orientation is readily obtained for inclined fractures with either BHTV or FMS logs, but the orientation of vertical fractures is commonly ambiguous on both logs.

Fortunately, crossed dipole acoustic logging can provide detailed information on the anisotropy of the subsurface formation. This method, based on the detection of split flexural modes, was developed by Schlumberger and designed to determine the orientation of vertical fractures and microcracks, as well as differences in horizontal stresses caused by azimuthal anisotropy. In fact, the present dipole-shear anisotropy technique has been used to determine the maximum stress direction of hydraulic fractures and to detect fracture zones behind cased wells for perforation decisions.

The present methodology used for processing borehole dipole sonic logs is based on the transversely isotropic Green's function defined by having the axis of symmetry perpendicular to the axis of the borehole and by five stiffness constants (i.e. $C_{11}$, $C_{13}$, $C_{33}$, $C_{44}$, and $C_{66}$) to characterize the formation. As a consequence, the data recorded by the cross-dipole acoustic system is processed for the azimuthal anisotropy of the formation only. The data is not processed for fracture aperture, fracture density, fluid properties, fracture separation, and fractured zones not intersected by the well. An approach is needed to model these parameters. In particular, since large fractures account for most of fluid flow, and wells may intersect only a few of these fractures, a technique is needed to detect those fractures near the well. Similar techniques can be applied to detect new fractures that may be developed near the well after hydraulic fracturing.

SUMMARY OF THE INVENTION

A method is presented to analyze full waveform multipole (i.e., monopoles, dipoles, quadrupoles) acoustic measurements in a fluid-filled borehole, surrounded by a system of fractures oriented parallel to the axis of the borehole. The method uses new attributes that have been named in this invention as the dual flexure waves and leaky fracture mode. These attributes can be observed only when an open fluid-filled fracture has been detected by a dipole sonic tool placed in a fluid-filled borehole. The method uses the properties of these attributes to detect, locate and characterize the fluid-filled fractures. The attributes are sensitive to the fracture aperture and the separation between the borehole and the fluid-filled fracture. The method includes analysis and processing of the full waveform dipole sonic data in the time and spectral domain for dipole sonic data recorded at different azimuthal orientations in the borehole. The potential benefits of the proposed invention include the following applications:

- Detect and locate natural single fluid-filled fractures by the well
- Detect and locate single fluid-filled fractures that may develop near the well after hydraulic fracturing
- Detect and locate multiple fluid-filled fractures by the well
- Determine the relative aperture of multiple fractures in the formation.

The invention described is a dipole sonic method using new attributes observed in the full waveform acoustic signatures for detecting, locating and characterizing single or multiple fractures in a reservoir formation. The attributes are the dual flexure waves and the leaky fracture mode. These attributes are excited by a dipole source in a fluid-filled borehole near or intersected by parallel, fluid-filled fracture. The attributes are sensitive to the orientation of the fracture, distance between the borehole and the fracture, and relative aperture of multiple fractures in the formation. A spectral analysis of the attributes provides information on the distance between the fluid-filled fracture and the borehole and the relative fracture aperture when more than one fracture has been detected in the formation.

DETAILED DESCRIPTION OF THE INVENTION

Figure 1:
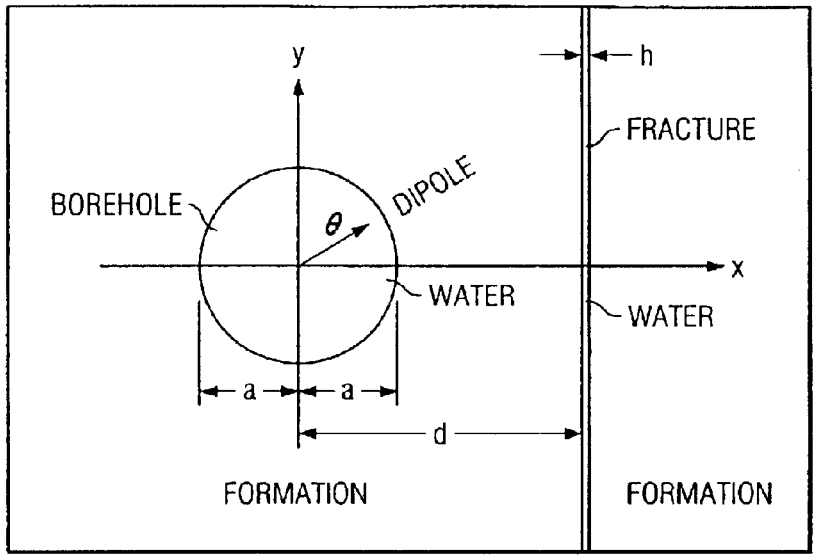
FIG. 1. Geometry of the borehole and parallel fracture.

The invention described is a method applied to fractured reservoirs to detect, locate and characterize vertical or near vertical fluid-filled fractures. The method is based on an analysis of full waveform dipole sonic signatures recorded at different dipole orientations in a fluid-filled borehole. The method uses new attributes that describe the presence, location, orientation and relative aperture of a fluid-filled fracture intersecting or near the borehole. The attributes are the dual flexure waves and the leaky fracture mode excited by a dipole source in a fluid-filled borehole close to or intersected by a fracture parallel to the axis of the well. The dual flexure wave attribute is characterized by two distinct guided wave modes that replace the borehole flexural mode excited in the absence of the fracture. The first mode of this attribute is shifted to a lower frequency, and has smaller amplitude and a significantly faster group velocity than the borehole flexural mode excited in the absence of the fracture. The second mode of this attribute is shifted to a higher frequency, and has larger amplitude, a moderately higher group velocity and a longer duration than the borehole flexural mode excited in the absence of the fracture. Both modes are seen in the spectrum as peaks. The leaky fracture mode is marked by a sharp minimum in the amplitude spectrum, representing the energy leakage to the fracture at the frequency of the minimum.

The borehole is modeled as a water-filled cylindrical cavity with z as its axis and r, θ as its radial and tangential coordinates, respectively. The borehole extends to infinity in both positive and negative z directions. An acoustic dipole source and a number of detectors are aligned along the z-axis with given separations. The surrounding medium is homogeneous, isotropic, visco-elastic and contains an infinite fluid-filled fracture parallel to the borehole axis. The fracture is a fluid layer with a thickness of h, and distance d from the center of the borehole. This fracture approaches the slip interface model of Haugen and Schoenberg (2000) when the thickness is very small compared to the wavelength. A plane view of the geometry is given in FIG. 1. Note that θ=0° is defined as the direction perpendicular to the fracture.

A fluid-filled borehole with a radius of 10 cm in a vertically fractured, otherwise uniform, isotropic formation is used. The P and S wave velocities of the formation are 5.87 and 2.92 km/s, respectively, and the quality factors, Qp and Qs, are assumed to be 80 and 40, respectively. The mass density of the formation is 2.7 gm/cm$^3$. Both the borehole and fracture are filled with water, whose mass density and P-wave velocity are 1.0 gm/cm$^3$ and 1.5 km/s, respectively. In addition, we simulate a sonic tool having 12 detectors with offsets from the source, z, equal to 2.70, 2.85, 3.00, 3.15, 3.30, 3.45, 3,60, 3.75, 3.90, 4.05, 4.20, and 4.35 m. A nonzero phase Ricker wavelet with a center frequency of 3 kHz is considered to calculate spectra and waveforms. In this earth model, the shear wavelength at this frequency is about 1 m, which is 5 times the borehole diameter.

Waveform Analysis

Figure 2:
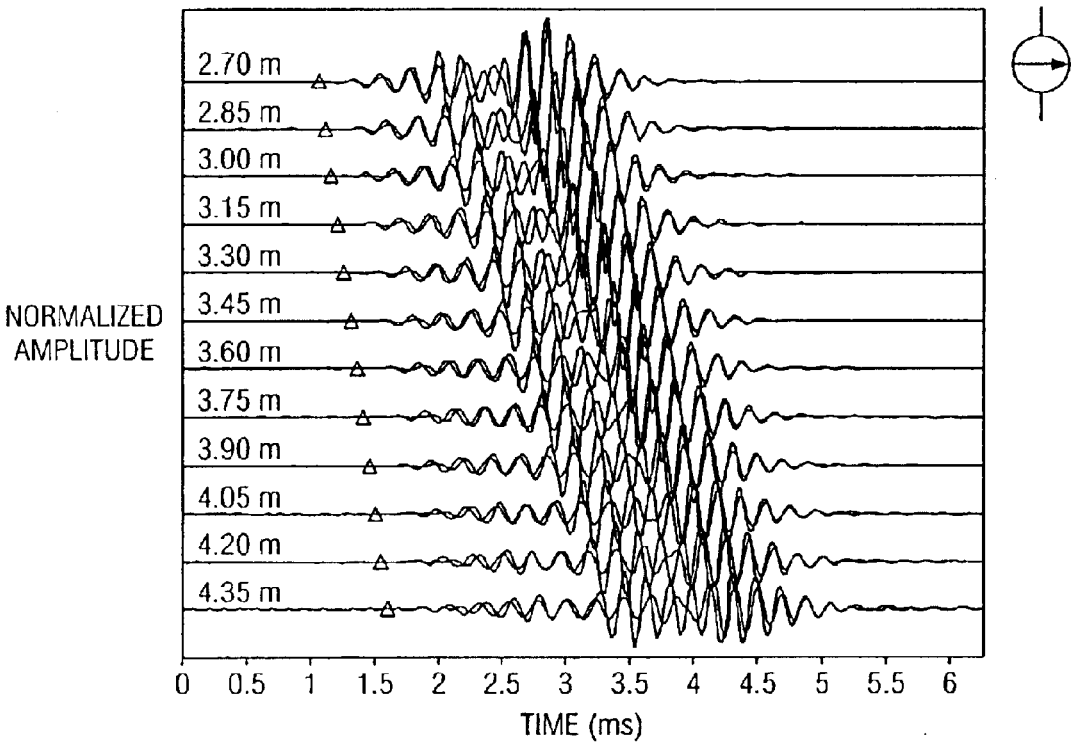
FIG. 2. Waveforms for dipoles perpendicular to the fracture ($\theta$=0°) in comparison to those without a fracture. The fracture has an aperture of h=0.5 cm and crosses the center of the borehole (d=0). The thin lines represent the fractured case and thick lines the uniform case. The source-detector offsets are labeled. Shear wave arrivals are marked by $\Delta$.

We begin the analysis with a comparison of waveforms for the uniform medium and the fractured medium. In the first example we analyze the case of dipoles in-line and perpendicular to the fracture (0/0°) as shown in FIG. 2. Here all detectors participate in the comparison. In this model, the fracture has an aperture of h=0.5 cm and passes through the center of the borehole (i.e. d=0). The model responses show a slightly reduced direct S wave velocity associated with the weakened stiffness of the formation in this direction. In addition, we observe an event with fairly strong amplitude between the S wave arrival and the borehole flexural wave. This event represents an additional flexural mode due to the presence of the fracture. On the other hand, we observe that the amplitude of the borehole flexural wave is slightly reduced with its group velocity remaining unchanged. The borehole flexural mode always follows the additional flexural mode. We call this attribute the dual flexural waves.

Figure 3:
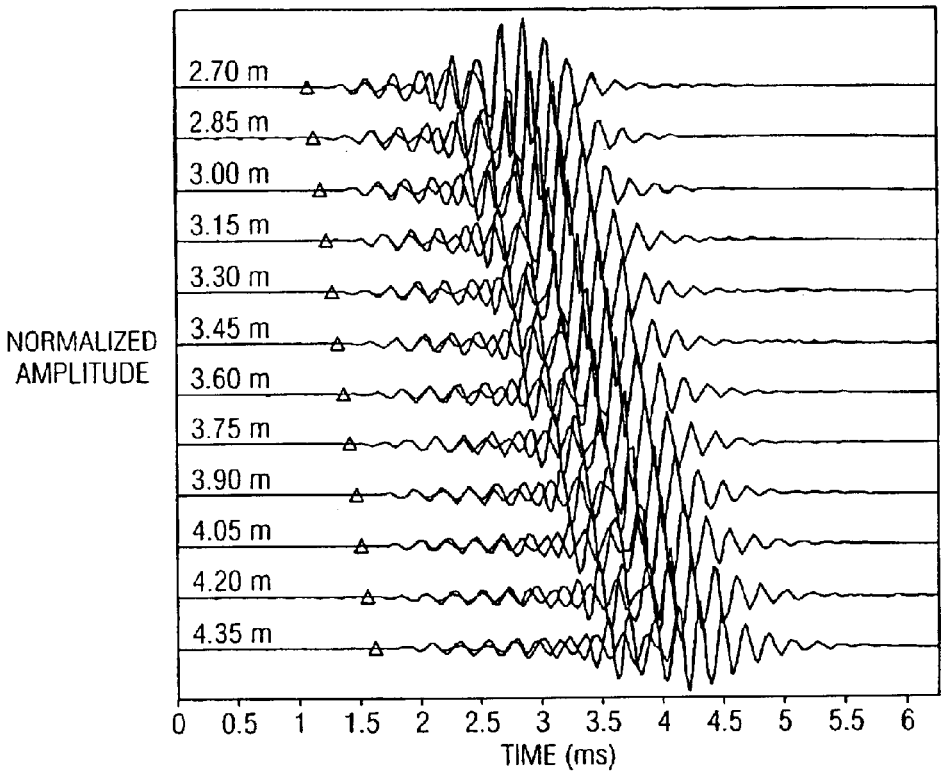
FIG. 3. Waveforms for dipoles parallel to the fracture ($\theta$=90°) in comparison to those without a fracture. The fracture has an aperture of h=0.5 cm and crosses the center of the borehole (d=0). The thin lines represent the fractured case and thick lines the uniform case. The source-detector offsets are labeled. Shear wave arrivals are marked by $\Delta$.

FIG. 3 illustrates the response for the dipole parallel to the fracture (90°/90° in-line) with the same model parameters as those used to produce FIG. 2. In this model application, the direct S wave has no loss in velocity, because the stiffness in this direction is not influenced by the fracture. Since the fluid-filled fracture is intersecting the path of the S wave, the amplitude of the S wave is reduced. The flexural wave associated with the fracture also arrives after the S wave and before the borehole flexural wave, while the borehole flexural wave maintains its amplitude and velocity.

Figure 4:
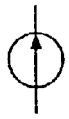
FIG. 4. Waveforms at the detector with an offset of 4.35 m for the following cases: (1) d=0; (2) d=0.2 m; (3) d=0.3 m; (4) d=0.5 m; (5) d=2 m; (6) uniform, isotropic formation; (7) 5% anisotropy; (8) 10% anisotropy; (9) 15% anisotropy; and (10) 20% anisotropy. The dipole is perpendicular to the fracture ($\theta$ =0°).
Figure 4:
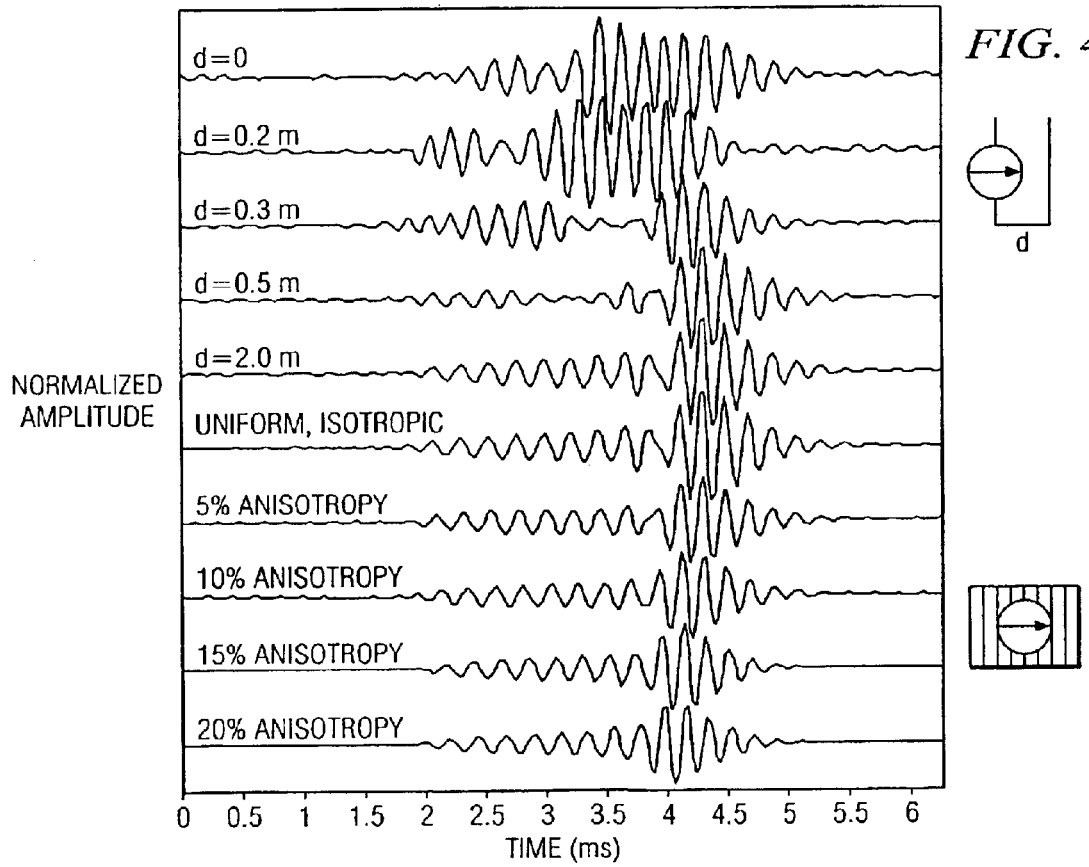
Figure 5:
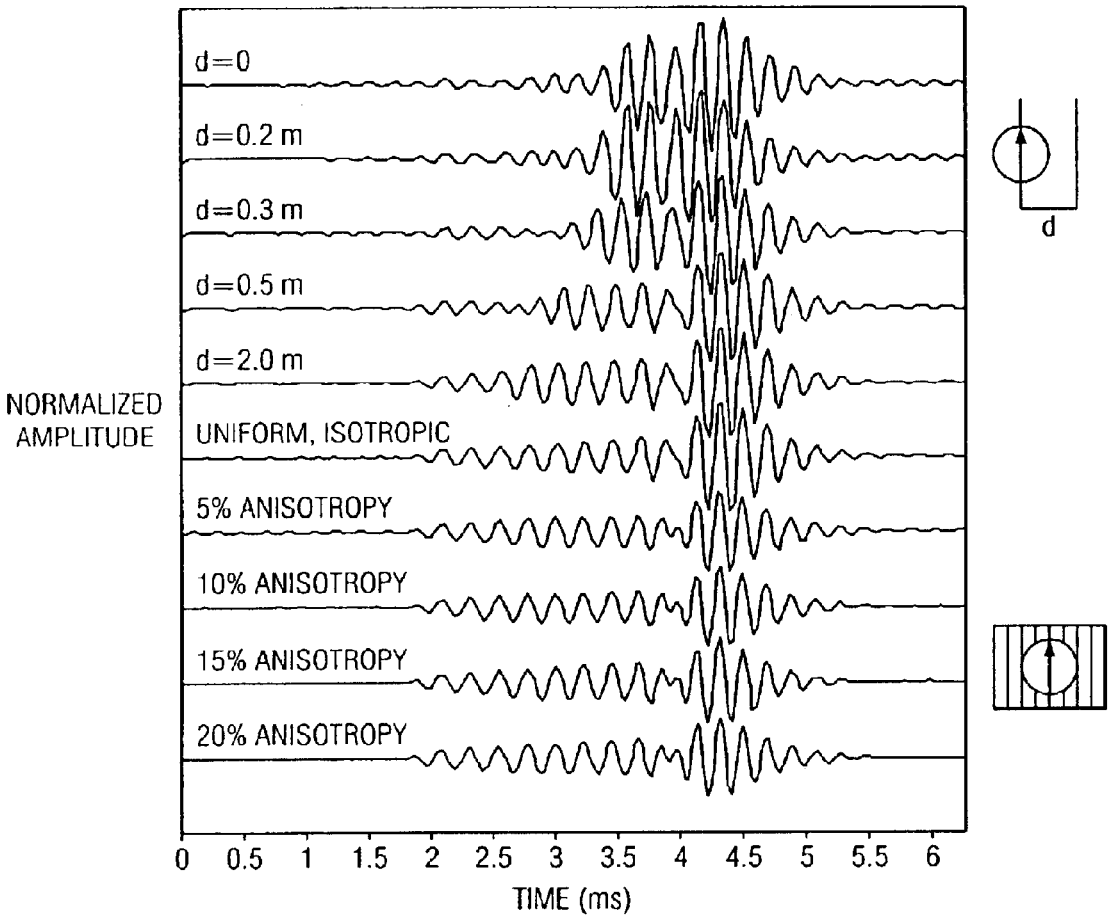
FIG. 5. Waveforms at the detector with an offset of 4.35 m for the following cases: (1) d=0; (2) d=0.2 m; (3) d=0.3 m; (4) d=0.5 m; (5) d=2 m; (6) uniform, isotropic formation; (7) 5% anisotropy; (8) 10% anisotropy; (9) 15% anisotropy; and (10) 20% anisotropy. The dipole is parallel to the fracture ($\theta$=0°).

In the next example, we select the farthest detector (z=4.35 m) of the sonic tool to analyze the effect of the distance between the fracture and the borehole, d, on the waveforms. FIGS. 4–5 illustrate the comparison of the seismograms corresponding to d=0, 0.2, 0.3, 0.5, and 2.0 m, with seismograms for a uniform isotropic formation. In addition, we address the effect of anisotropy by including in FIGS. 4 and 5 the responses of four uniform formations with azimuthal anisotropy. The elastic properties of these formations are derived by reducing the original compression and shear elastic moduli in the x-direction by 5%, 10%, 15%, and 20%, respectively, i.e., the reduction of the P and S wave speeds is approximately 2.5%, 5%, 7.5% and 10%, respectively.

FIG. 4 studies the case of dipoles perpendicular to the fracture (0°/0°). The seismograms show that among the four anisotropic cases, the stronger the anisotropy, the faster the group velocity of the borehole flexural wave. However, variations in the amplitude and shape of the waveforms are moderated and smooth. We see the dual flexural waves when the fracture is present and d<2.0 m. The first flexural wave is mainly associated with the fracture and has a much faster velocity and smaller amplitude than that in the uniform formation. With the increased distance between the fracture and the borehole, d, the velocity and duration of this flexural wave increases but the amplitude is reduced. The second flexural wave is a modified borehole flexural wave, with about the same amplitude, a faster velocity and longer duration. The duration of this flexural wave decreases as d is increased. In addition, we observe that for d<a, (where a is the borehole radius as illustrated in FIG. 1), these two flexural waves are mixed. On the other hand, no significant effects of the fracture on the flexure waves can be seen for d greater than 0.5 m (2.5 times the borehole diameter or one half of the wavelength).

FIG. 5 shows the response of in-line dipoles parallel to the fracture (90°/90°). In this configuration the flexural wave associated with the fracture disappears. Alternatively, the modified borehole flexural wave is influenced by the fracture for 0<d<0.3 m. This wave arrives earlier than the original borehole flexural wave and has a longer duration. However, the effect of d is insignificant. All fractured cases for d=0.5 m (one half of the wavelength) and 2 m (two wavelengths) are very close to that of the uniform isotropic case.

Spectral Analysis

The effects of a fracture can be alternately and more quantitatively evaluated by looking at amplitude spectra. FIGS. 6–11 illustrate the effects of d and h on the amplitude spectra.

For dipoles oriented perpendicular to the fracture (0°/0°) and d=0 (FIG. 6, whose waveforms are given in FIG. 2), the original spectra, a single peak at 5.25 kHz, is now split into two: an equally high peak at 5.7 kHz and a much lower peak at 4.8 kHz, with a sharp dip (minimum) between them at 5.1 kHz. These two peaks are the spectral form of the dual flexural modes defined above. The dip indicates a leaky flexural mode due to the fracture.

Figure 6:
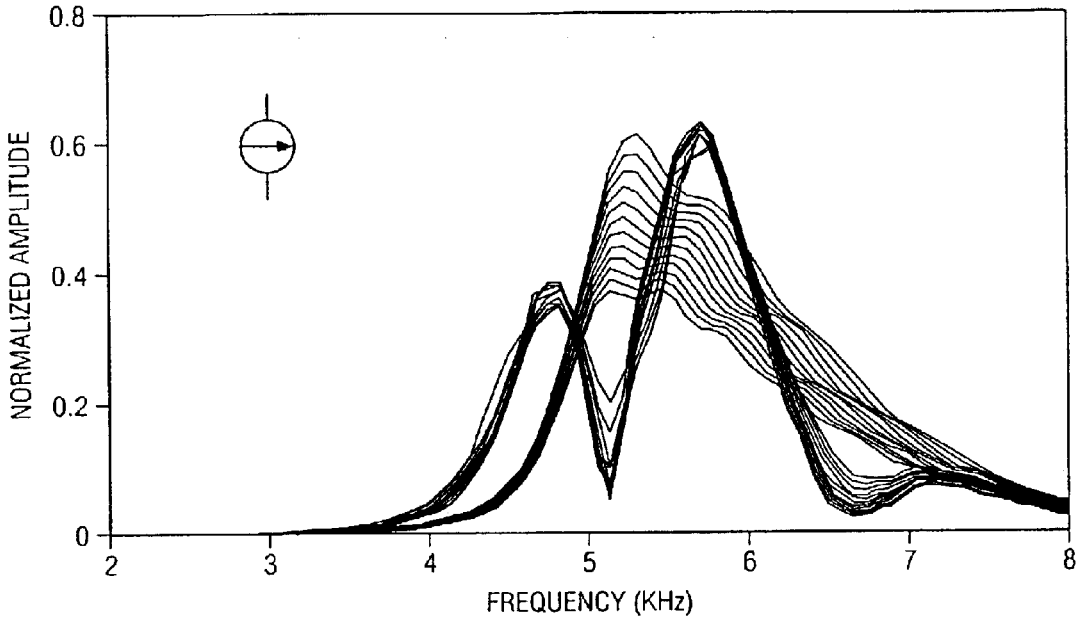
FIG. 6. A comparison of amplitude spectra for the fractured (thin lines) and uniform (thick lines) cases. In the fractured case, the dipole is perpendicular to the fracture (θ=0°). The fracture has an aperture of h=0.5 cm and crosses the center of the borehole (d=0). In each group, the detector offsets are (from top): 2.70, 2.85, . . . 4.35 m.
Figure 7:
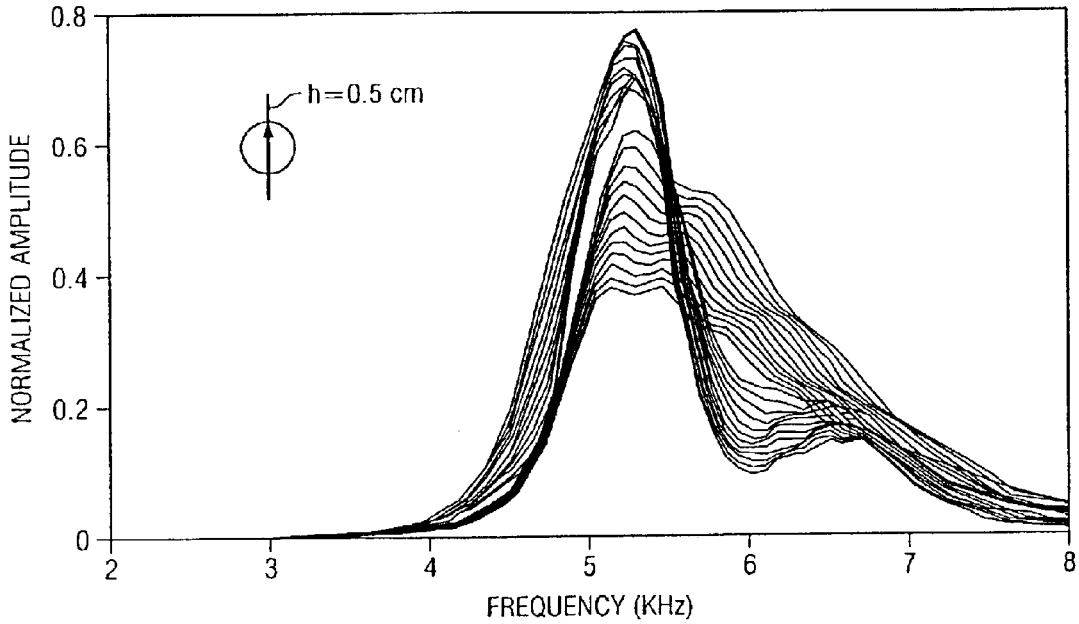
FIG. 7. A comparison of amplitude spectra for the fractured (thin lines) and uniform (thick lines) cases. In the fractured case, the dipole is parallel to the fracture (θ=90°). The fracture has an aperture of h=0.5 cm and crosses the center of the borehole (d=0). In each group, the detector offsets are (from top): 2.70, 2.85, . . . 4.35 m.

On the other hand, for in-line dipoles parallel to the fracture (90°/90°), the spectra (FIG. 7, whose waveforms are given in FIG. 3) maintain their peak at the same frequency (5.25 kHz) with slightly higher amplitude and an additional minor peak at 6.5 kHz. No sharp dip is present. FIGS. 6 and 7 show that the spectra of all detectors are more tightly packed at all frequencies in the fractured case than in the uniform case, which indicates that the flexural waves in the fractured borehole have less significant distance decay than in the borehole without a fracture.

Figure 8:
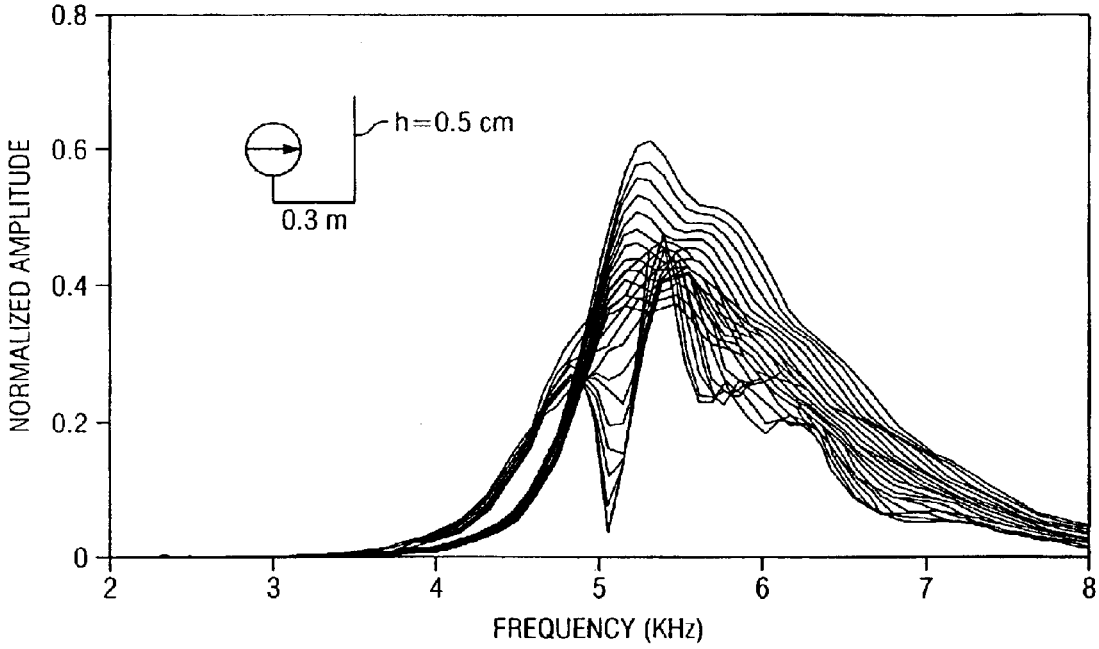
FIG. 8. A comparison of amplitude spectra for the fractured (thin lines) and uniform (thick lines) cases. In the fractured case, the dipole is perpendicular to the fracture (θ=0°). The fracture has an aperture of h=0.5 cm and its distance from the center of the borehole is d=0.3 m. In each group, the detector offsets are (from top): 2.70, 2.85, . . . 4.35 m.
Figure 9:
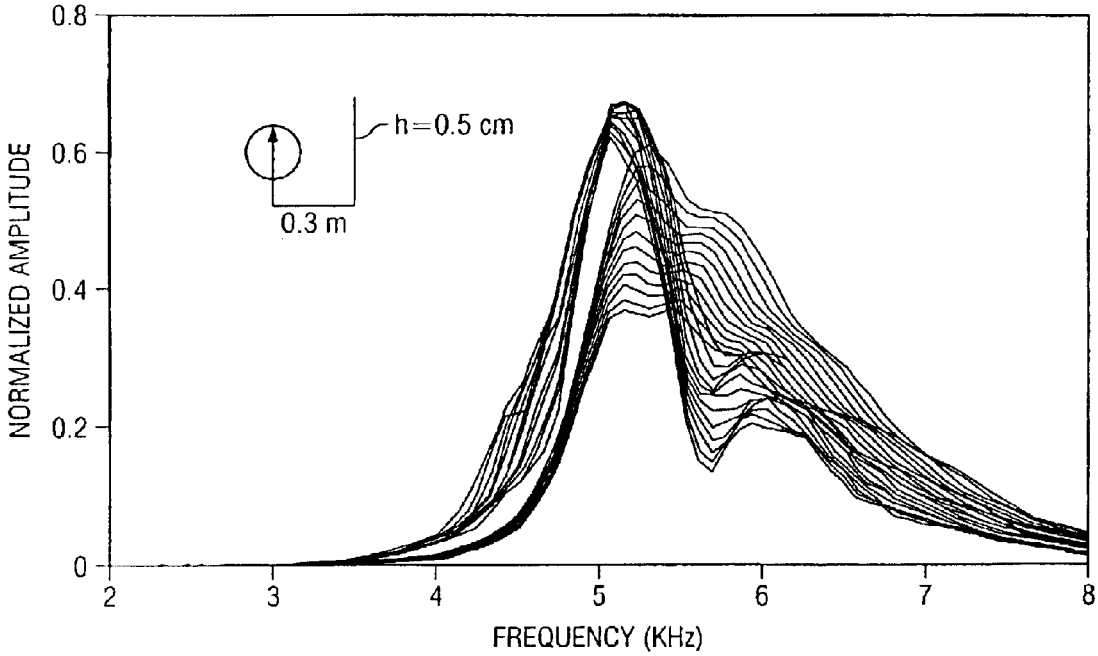
FIG. 9. A comparison of amplitude spectra for the fractured (thin lines) and uniform (thick lines) cases. In the fractured case, the dipole is parallel to the fracture (θ=90°). The fracture has an aperture of h=0.5 cm and its distance from the center of the borehole is d=0.3 m. In each group, the detector offsets are (from top): 2.70, 2.85, . . . 4.35 m.
Figure 10:
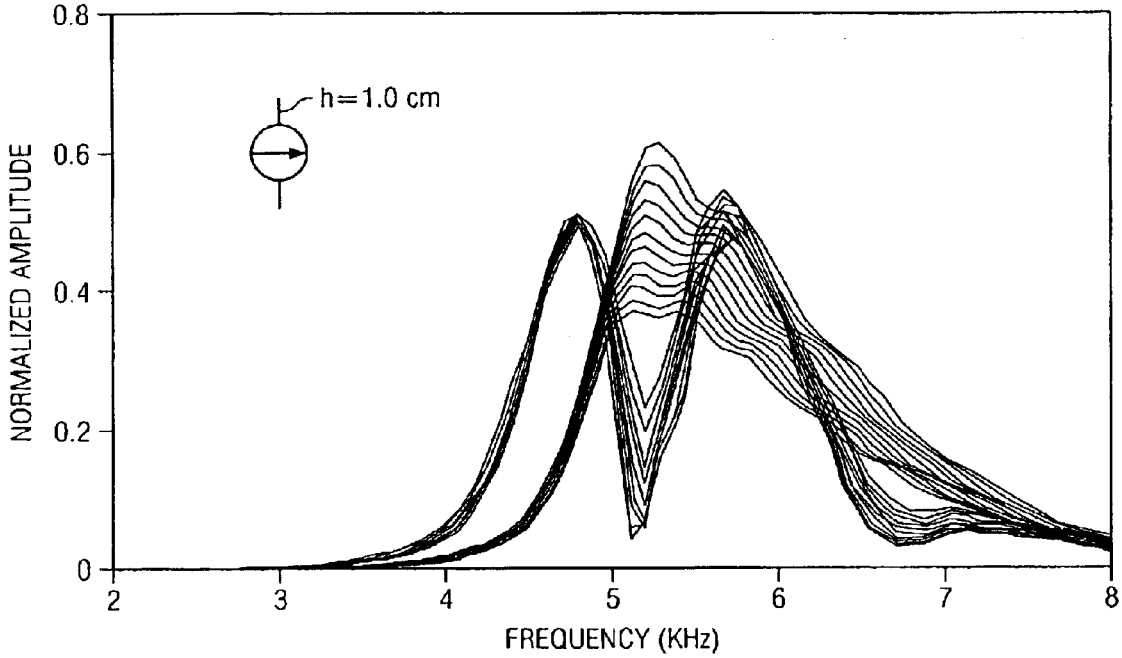
FIG. 10. A comparison of amplitude spectra for the fractured (thin lines) and uniform (thick lines) cases. In the fractured case, the dipole is perpendicular to the fracture (θ=0°). The fracture has an aperture of h=1 cm and crosses the center of the borehole (d=0). In each group, the detector offsets are (from top): 2.70, 2.85, . . . 4.35 m.
Figure 11:
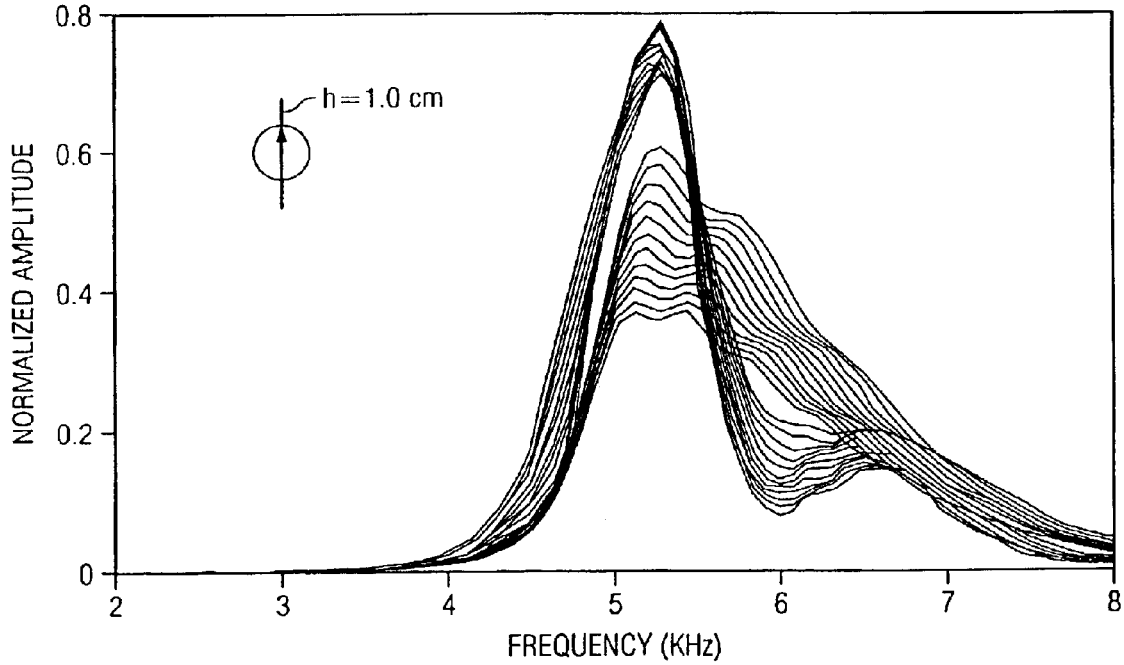
FIG. 11. A comparison of amplitude spectra for the fractured (thin lines) and uniform (thick lines) cases. In the fractured case, the dipole is parallel to the fracture (θ=90°). The fracture has an aperture of h=1 cm and crosses the center of the borehole. In each group, the detector offsets are (from top): 2.70, 2.85, . . . 4.35 m.

In FIG. 8, for dipoles oriented perpendicular to the fracture (0°/0°, d=0.3 in), the dip remains at about 5 kHz. Unlike in the case of d=0, the sharpness and depth of the dip increase gradually with z. The in-line dipoles parallel to the fracture (90°/90°) for d=0.3 m and the spectra in FIG. 9 are similar to their counterparts in FIG. 7 (90°/90°, d=0). This again shows that seismograms in the 90°/90° configuration are insensitive to d.

Finally, the effect of fracture aperture on the spectra is analyzed. When the configuration is an inline dipole parallel to the fracture (90°/90°) the difference between h=0.5 cm (FIG. 7) and h=1.0 cm (FIG. 11) is negligible. When the dipoles are oriented perpendicular to the fracture (0°/0°, FIGS. 6 and 10), the locations of the dip and of the two spectral peaks are the same for both h=0.5 cm and 1.0 cm. However, in the former, the height of the peak at 4.8 kHz is 60% of that at 5.7 kHz, while in the latter, both peaks have about the same height, slightly lower than the original one. Therefore, a thinner fracture has higher frequency content. Nevertheless, the waveforms exhibit almost no difference (waveforms for h=1.0 cm are not shown).

What is claimed is:

1. A method to detect a fluid-filled fracture in a formation surrounding a borehole, comprising the steps of:

generating acoustic waves using a dipole source in a fluid-filled borehole intersecting or near vertical fluid-filled fractures in the formation surrounding the borehole; and analyzing dual flexure waves and a leaky fracture mode resulting from the acoustic waves.

2. The method of claim 1, wherein the dual flexure waves and leaky fracture mode are further used to determine the distance between the borehole and the fracture in the formation surrounding the borehole.

3. The method of claim 1, wherein the dual flexure waves and leaky fracture mode are further used to determine the position and orientation of the fracture in the formation surrounding the borehole.

4. The method of claim 1, wherein the dual flexure waves and leaky fracture mode are further used to determine the relative fracture aperture of multiple fractures in the formation surrounding the borehole.

5. The method of claim 1, wherein the analyzing step is performed as follows: (a) the first mode of the dual flexure wave is shifted to a lower frequency and has smaller amplitude and significantly faster group velocity than the flexure mode excited in a borehole surrounded by a uniform earth medium without a fracture; (b) the second mode of the dual flexure wave is shifted to a higher frequency and has larger amplitude, a moderately higher group velocity, and longer duration than the fundamental flexure mode that is excited in the borehole in the absence of the fracture; (c) the modes defined in (a) and (b) are seen in the amplitude spectrum as peaks; and (d) the leaky fracture mode is represented by a sharp minimum in the amplitude spectrum. At the frequency of the minimum, a considerable amount of energy leaks to the fracture. This leakage reaches its full capacity when the fracture intersects the borehole.

6. A method to determine the distance, d, between a borehole and a fluid-filled fracture in the formation surrounding the borehole, having a radius, a, comprising the steps of:

generating acoustic waves using a dipole source in a fluid-filled borehole intersecting or near vertical fluid-filled fractures in the formation surrounding the borehole;

and analyzing dual flexure waves and a leaky fracture mode resulting from the acoustic waves;

wherein the analyzing step is performed by recognizing that a fracture within about half the wavelength or 3 times the borehole diameter from the borehole center has a significant effect on the dipole acoustic wave; that for d>a, the separation of the dual flexural waves increases with d, but the amplitude of the first flexural wave decreases with d The leaky fracture mode is well developed only for detectors at large offset; and that for d<a, the dual flexural waves are mixed, and the leaky fracture mode is well developed for all detectors.

7. A method to determine the position and orientation of a fluid-filled fracture in a formation surrounding a borehole, comprising the steps of:

generating acoustic waves using a dipole source in a fluid-filled borehole intersecting or near vertical fluid-filled fractures in the formation surrounding the borehole;

and analyzing dual flexure waves and a leaky fracture mode resulting from the acoustic waves;

wherein the analyzing step is performed by recognizing that the orientation of the fracture can be easily determined from the distinct properties of borehole acoustic waves for dipoles oriented perpendicular to the fracture (0°/0°) and parallel to the fracture (90°/90°); that the (0°/0°) case has a slower direct S wave with no amplitude loss, while in the (90°/90°) case, the direct S wave maintains its velocity but often with notable amplitude loss; that more significant differences are in the flexural waves; and that the dual flexural waves and leaky fracture mode reach their maximum at the orientation (0°/0°) and vanish at the orientation (90°/90°).

8. A method to determine the relative fracture aperture of multiple fluid-filled fractures in a formation surrounding a borehole, comprising the steps of:

generating acoustic waves using a dipole source in a fluid-filled borehole intersecting or near vertical fluid-filled fractures in the formation surrounding the borehole;

and analyzing dual flexure waves and a leaky fracture mode resulting from the acoustic waves;

wherein the analyzing step is performed by recognizing that in the spectra, a higher peak in the higher frequency regime is an indicator of a smaller fracture aperture, such that if multiple fractures are detected, separately or simultaneously, in the formation surrounding the borehole, the relative fracture aperture can be determined by comparing their spectral responses.

* * * * *